(12) United States Patent
Hartmann et al.

(10) Patent No.: US 7,171,042 B2
(45) Date of Patent: Jan. 30, 2007

(54) SYSTEM AND METHOD FOR CLASSIFICATION OF IMAGES AND VIDEOS

(75) Inventors: Alexander J. Hartmann, Santa Clara, CA (US); Rainer W. Lienhart, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 09/729,867

(22) Filed: Dec. 4, 2000

(65) Prior Publication Data

US 2002/0067857 A1    Jun. 6, 2002

(51) Int. Cl.
    *G06K 9/62* (2006.01)
(52) U.S. Cl. .................................. 382/159; 382/224
(58) Field of Classification Search ................ 382/159, 382/160, 158, 161, 224, 225, 155, 156, 157; 700/47, 48; 600/408
    See application file for complete search history.

(56) References Cited

U.S. PATENT DOCUMENTS

| 5,491,627 | A | * | 2/1996 | Zhang et al. | 600/408 |
|---|---|---|---|---|---|
| 5,867,593 | A | * | 2/1999 | Fukuda et al. | 382/176 |
| 6,396,954 | B1 | * | 5/2002 | Kondo | 382/224 |
| 6,421,463 | B1 | * | 7/2002 | Poggio et al. | 382/224 |

OTHER PUBLICATIONS

Distinguishing photographs and graphics on the WWW, by Athitsos et al., IEEE 1997.*
Classifying images on the web automatically, by Lienhart, IEEE Jun. 2002.*
Localizing and segmenting text in images and videos, by Lienhart et al, IEEE 2002.*
On the segmentation of test in videos, by Wernicke et al , IEEE 2000.*
Vailaya, Aditya et al. "A Bayesian Framework for Semantic Classification of Outdoor Vacation Images".
Vailaya, Aditiya. "Semantic Classification in Image Databases". Dissertation, 2000.
Gorkani, Monika M., Rosalind W. Picard. "Texture Orientation for Sorting Photos 'at a Glance'". IEEE. 1994. pp. 459-464.
Yiu, Elaine, Frederico Girosi. "Image Classification Using Color Cues and Texture Orientation". 1996.
Bradshaw, Ben. "Semantic Based Image Retrieval: A Probabilistic Approach". pp. 167-175.
Kingsbury, Nick. "The Dual-Tree Complex Wavelet Transform: A New Efficient Tool for Image Restoration and Enhancement".
Athitsos, Vassilis et al. "Distinguishing Photographs and Graphics on the World Wide Web".
Kohonen, Teuvo et al. "LVQ-PAK: The Learning Vector Quantization Program Package".
Banham, Mark R., Aggelos K. Katsaggelos. "Digital Image Restoration". IEEE. 1997. pp. 24-41.
Lienhart, Rainer and Axel Wernicke, "Localizing and Segmenting Text in Images and Videos". IEEE. vol. 12, No. 4, Apr. 2002. pp. 256-268.

* cited by examiner

*Primary Examiner*—Vikkram Bali
(74) *Attorney, Agent, or Firm*—Blakely, Sokoloff, Taylor & Zafman LLP

(57) ABSTRACT

Systems and methods are provided through which a graphic image is classified in terms of being natural versus computer generated, or being a scientific slide presentation versus a comic image. The image is classified by extracting appropriate feature(s) from the image, and using the feature(s) to determine, within a predetermined degree of accuracy, the graphic classification of the image.

The classification determination uses a trained model. The trained model is created by using machine learning algorithms such as Neural Networks, Support Vector Machines, and Learning Vector Quantizations.

Subsequently, the trained model is used to classify a group of images of unknown classification automatically.

21 Claims, 14 Drawing Sheets

SYSTEM AND METHOD FOR CLASSIFICATION OF IMAGES AND VIDEOS

FIELD OF THE INVENTION

This invention relates generally to image processing, and more particularly to identification of images.

BACKGROUND OF THE INVENTION

Users search for image files or video stream files with certain characteristics on file systems, databases or networks, such as the Internet. Searches are performed in order to locate files related to a particular subject matter or topic. Internet-users base searches for graphic files on textual hints, such as the name of the file, ALT-tag, and/or an association with a web page having characteristics that match the search criteria. Internet-users can also base a search on a particular encoding scheme, such as MP3, in order to locate files that are encoded in a scheme that is compatible with software tools of the user or to locate files that meet a threshold of quality.

Users may also desire to search for graphic files by other criteria, seeking, for instance, natural images that have been digitized or scanned, computer generated images that have been rendered or ray-traced, scientific slide presentations, or comic images. However, because files are not readily identifiable as having those characteristics, the search is accomplished by locating the file, loading and displaying the file in a graphical display tool, and then manually viewing the file to determine if the file has these characteristics. This is a slow and expensive manual classification process.

Furthermore, the characteristics of image files or video stream files have an influence on, dictate, or direct, how a video stream or image is stored, retrieved and/or processed. These characteristics are important because actions can be taken to optimize the speed or storage capacity in storing, retrieving, and/or processing the graphic files. However, these characteristics of the file are not readily discernable. Media portals, such as yahoo.com, use automated tools to store, index, retrieve and process graphic files. When automated tools store, retrieve and process the graphic files, the inability to readily distinguish between files based on the file characteristics of digitized or scanned, computer generated from rendering or ray-tracing, scientific slide presentation, or comic, leaves the tools incapable of optimizing the storing, retrieving and processing of the graphic file.

There is a need in media portals to be able to classify graphic files in terms of whether they are natural images that have been digitized or scanned, artificial computer generated images that have been rendered or ray-traced, scientific slide presentations, or comic images, without manual classification.

For the reasons stated above, and for other reasons stated below which will become apparent to those skilled in the art upon reading and understanding the present specification, there is a need in the art for the ability to distinguish between natural images and artificial images and to distinguish between slide images and comic images.

DETAILED DESCRIPTION OF THE INVENTION

In the following detailed description of embodiments of the invention, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, a system level overview of the invention is presented. In the second section, methods for an embodiment of the invention are provided. In the third section, a particular object-oriented Internet-based implementation of the invention is described. Finally, in the fourth section, a conclusion of the detailed description is provided.

System Level Overview

Figure 1:
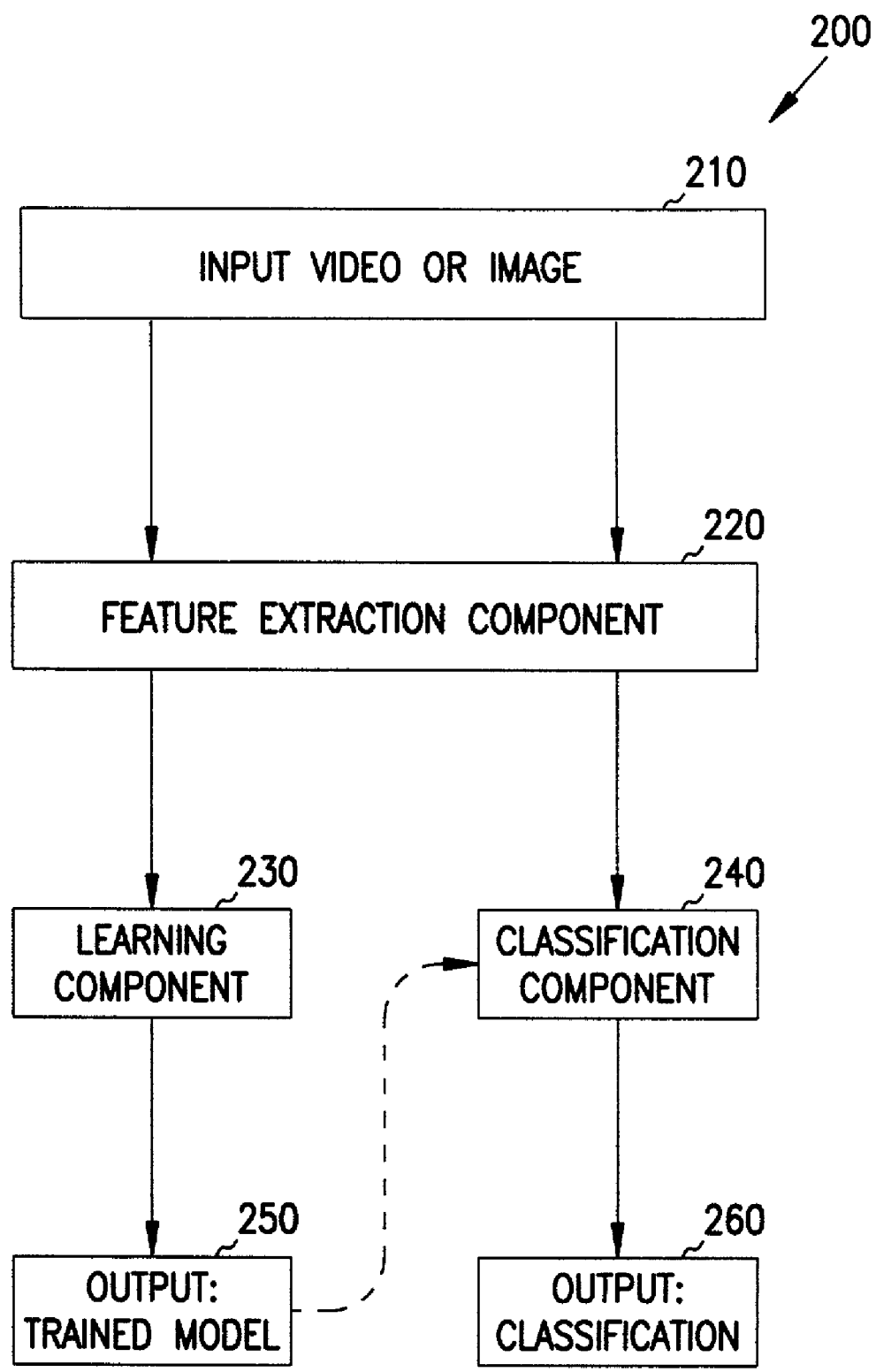
FIG. 1 is a diagram illustrating a system-level overview of an embodiment of the invention.

FIG. 1 is a block diagram that provides a system level overview 200 of the operation of embodiments of the present invention. Embodiments of the invention are described as operating in a multi-processing, multi-threaded operating environment on a computer or any other device. However, the invention is not limited to multi-processing, multi-threaded operating environments and computers; for example, the invention also operates in single-processor/single-threaded systems, on embedded devices, such as personal digital assistants, handheld electronic devices, palmtop electronic devices, cellular phones containing a processor, or it can be implemented directly into hardware chips which are specialized to do this classification.

System 200 includes a digital image and/or a series of images composed as a video stream 210. The image/video 210 is received by a feature extraction component 220. The feature extraction component 220 extracts one or more chosen or predetermined features (not shown) from the image/video 210. Examples of features are noise and sharpness of edges.

The extracted feature is received by the learning component 230. The learning component 230 uses the extracted feature to determine classification data (not shown) of extracted features, and thereafter, the classification data is stored by a trained model 250. The features stored are floating point or integer numbers which correspond to for example a digitized or scanned image, a computer-generated image, a comic or a slide.

The learning component 230 implements any one of a number of machine learning algorithms, such as a Learning Vector Quantization, Neural Network, or Support Vector Machine.

In one embodiment, the feature extraction component 220, the learning component 230, and the trained model 250 comprise a training system.

A number of image/videos that are representative of a class of image/video can be processed by the learning component 230 in order to develop a robust trained model, thereby increasing the accuracy of the trained model 250.

The classification component 240 determines a most probable classification 260 of an image/video 210 from the extracted feature and the trained model 250. The classification component 240 acts as a trained classifier of the image/video 210 when the classification component 240 acts in reference to the trained model 250. The classification component 240 is also known as a classifier.

In one embodiment, the feature extraction component 220, the classification component 240, and the trained model 250 comprise a classification system.

The system level overview of the operation of an embodiment of the invention has been described in this section of the detailed description. System 200 enables image files 210 to be classified, without manual classification, in terms of features, such as a natural image that has been digitized or scanned versus a computer generated image that has been rendered or ray-traced, or a scientific slide presentation versus a comic image. While the invention is not limited to any particular trained model, learning component or classification component, or image or video, for sake of clarity a simplified trained model, learning component or classification component, or image or video has been described.

Methods of an Embodiment of the Invention

In the previous section, a system level overview of the operation of an embodiment of the invention was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients (the processor of the clients executing the instructions from computer-readable media, the processor operably coupled to a storage device). Similarly, the methods performed by the server computer programs, firmware, or hardware are also composed of computer-executable instructions. Describing the methods by reference to flowcharts enables one skilled in the art to develop programs, firmware, or hardware, including instructions to carry out the methods on a suitable computerized server (the processor of the server executing the instructions from computer-readable media). Methods 300–1400 are performed by a program executing on, or performed by firmware or hardware that is a part of, a computer, as well as from embedded devices or circuits specialized to do classification.

Discriminating Between Natural and Computer-generated Images.

Figure 2:
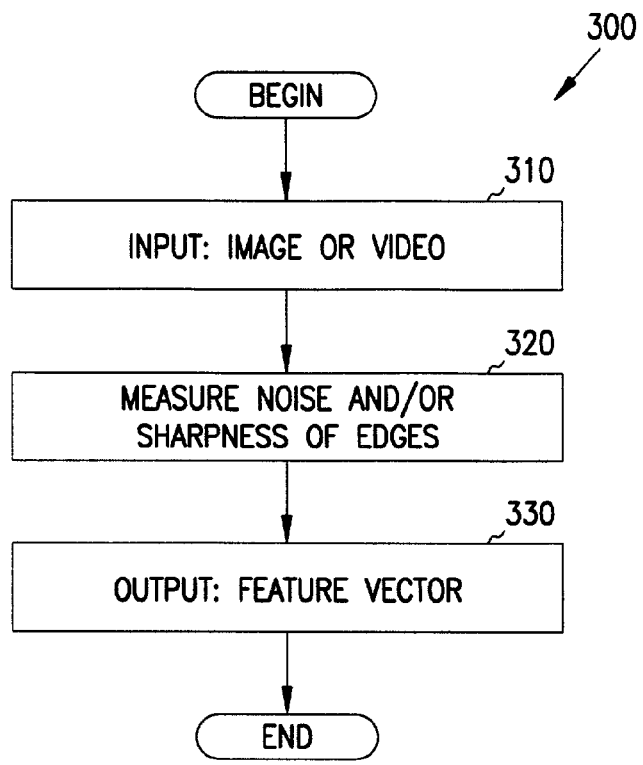
FIG. 2 is a flowchart of a method of extracting a feature from an image for classifying the image by natural image versus artificial image, performed according to an embodiment of the invention.

FIG. 2 is a flowchart of a method 300 of extracting a feature from an image for purposes of classifying the image by natural image versus artificial computer-generated image, performed according to an embodiment of the invention.

The class of natural images encompasses all images taken from nature. Examples of natural images includes digital photos and video frames. The class of artificial images includes all ray-tracing images and images from graphic tools such as Adobe Photoshop, and computer games.

In one embodiment, method 300 is performed by feature extraction component 220 in FIG. 1.

Method 300 includes receiving or inputting 310 from a first image or from a video frame. In one embodiment of method 300, the image is a frame in a video stream.

Thereafter, method 300 includes measuring noise in the image and/or sharpness of edges 320. Subsequently, the method includes outputting and/or generating the feature vector.

In one embodiment of the present invention, a feature vector is an array of numbers. For example, for the 'natural/artificial' classification of method 300, the array contains 1024 numbers between 0 and 1, in which the fraction of pixels have a difference value of 0, 1, 2, . . . 255, which is four times for a radius of 1, 2, 3 and 4. Furthermore, the array is an array of numbers, either floating point or integer, depending on the particular class/feature.

Method 300 is used in the discriminating, distinguishing or classifying an image according to whether the image is a natural image that was scanned or digitized into a digital graphic format, or whether the image was computer-generated that rendered or ray-traced. One or more graphical features, such as random noise and the sharpness of the graphical image, can be used to classify the image as natural or computer-generated.

Extracting Noise Vectors

Figure 3:
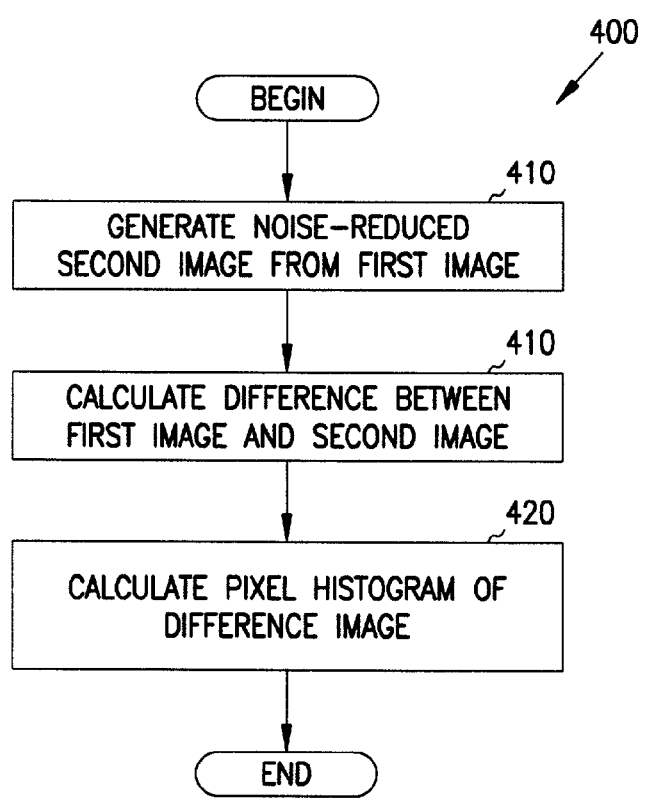
FIG. 3 is a flowchart of a method of one embodiment of the action of measuring one or more noise vectors in FIG. 2, performed according to an embodiment of the invention.

FIG. 3 is a flowchart of a method 400 of one embodiment of the action of measuring one or more noise vectors 320 in FIG. 2, performed according to an embodiment of the invention.

Method 400 includes generating a noise-reduced second image from the first image 410. The first image is used as input to a process or component that generates a second image that has reduced noise of the first image. In varying embodiments, generating a noise-reduced second image from the first image 410 further includes applying a low pass filter, such as a median filter, applying a Gaussian filter, and/or applying a Wiener filter. A low pass filter is used in digital image processing to remove the high frequency component or noise, resulting in a smoothed image. Low pass filters are usually based upon a moving average or median approach. A median filter is a low pass filter based upon a calculation of the median value of a neighborhood of pixels. A Gaussian Filter is an algorithm smoothing spatial variations in an image or the spatial and/or temporal variations in a video by averaging neighboring values of light intensity, the contribution of values to the average being weighted according to a Gaussian function.

Thereafter, method 400 includes determining, and/or calculating, 420 a pixel histogram of the difference image. The resulting histogram is taken as a feature vector for the learning component 230 in FIG. 1 or the classification component 240 in FIG. 1.

Extracting Edge-sharpness Vectors.

Figure 12:
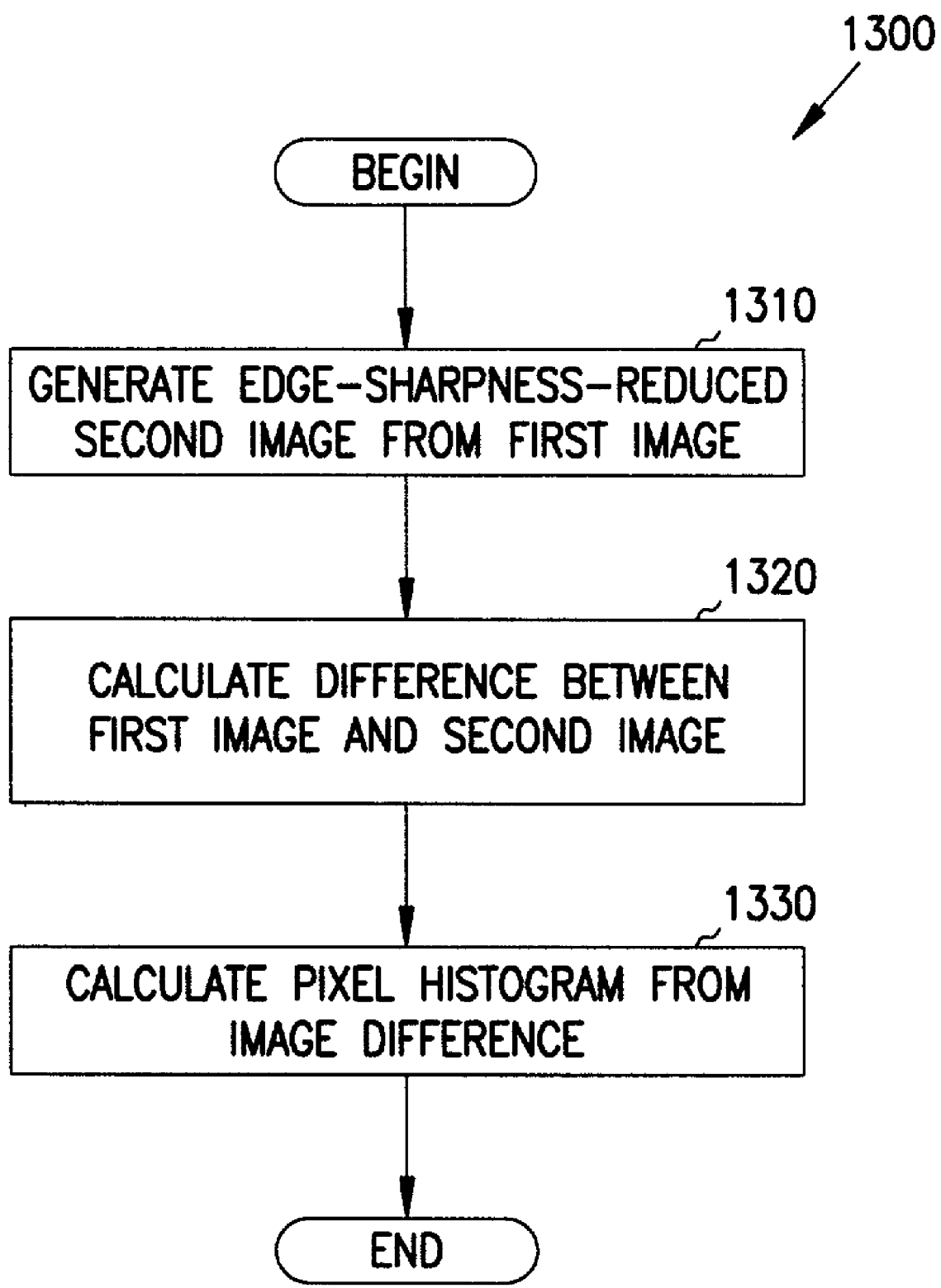
FIG. 12 is a flowchart of a method of extracting an edge-sharpness feature vector, performed according to an embodiment of the invention.

FIG. 12 is a flowchart of a method 1300 of extracting an edge-sharpness feature vector, performed according to an embodiment of the invention.

Method 1300 includes generating a sharpness-reduced, or blurred, second image from the first image 1310. The first image is used as input to a process or component that generates a second image that has reduced sharpness of the first image. The process of reducing sharpness affects sharp edges more than fuzzy edges, and thus allows finding sharp edges. In varying embodiments, reducing edge-sharpness in the second image 1320 includes applying a Gaussian filter to the second image. Thereafter, the method includes determining, and/or calculating, the difference between the first image and the second image 1320, and aggregating the difference image into a pixel difference histogram, which in turn yields a feature vector 1330.

In method 1300, the resulting feature vector is an edge-sharpness vector. The resulting edge-sharpness vector is used in the training action 310 in FIG. 2 to train the system to recognize the first image as natural or computer-generated. It is also used in the classification component 240 in FIG. 1.

Discriminating Between Scientific Slide Presentations and Comic Images.

Figure 4:
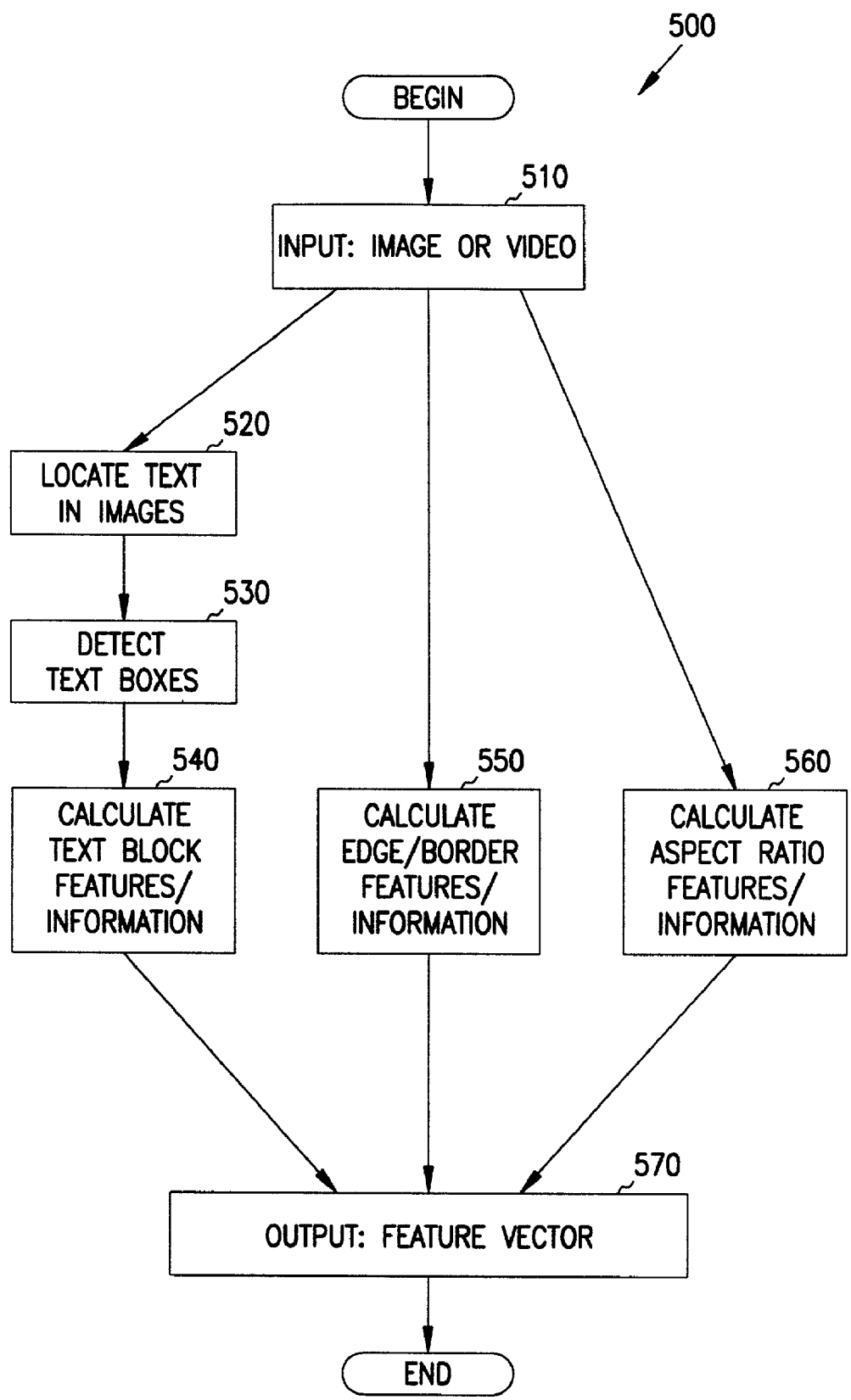
FIG. 4 is a flowchart of a method of extracting a feature vector from an image for purposes of classifying the image by slide image versus comic image, performed according to an embodiment of the invention.

FIG. 4 is a flowchart of a method 500 of extracting a feature vector from an image for purposes of classifying the image by slide image class versus comic image class, performed according to an embodiment of the invention. In one embodiment, method 500 is performed by feature extraction component 220 in FIG. 1.

The class of slide presentations includes all images showing slide independently of whether they were created digitally by a presentation program, such as Microsoft Powerpoint or by hand. Many scientific posters fall into this class, because they are designed like a single slide. The class of comics includes the cartoons in newspapers and books as well as other kinds of comics. Slide presentations and comics may be in color or in black and white.

Method 500 includes receiving or inputting 510 a first image. In one embodiment of method 500, the image is a frame in a video stream.

Method 500 also includes locating text from the first image 520, yielding a text-defined image. Subsequently, the method also includes detecting text boxes from the text-defined image 530, yielding a text-box defined image. Thereafter method 500 includes calculating text block features and/or information from the text-box defined image 540.

The method also includes calculating edge/border features/and or information from the first image 550, yielding an edge/border defined image, and calculating the aspect ratio of the image 560.

Subsequently, method 500 include generating a feature vector 570 from the aspect ratio yielded by action 560, from the text block features and/or information yielded by action 540, and from the edge/border defined image yielded by action 550.

In one embodiment of the present invention, a feature vector is an array of numbers. For example, for the comic/scientific classification of method 500, the array contains the number of horizontal and vertical edges in each direction of a number of specific lengths, the aspect ratio, the average width/height of textblocks, etc. Further, the array is an array of numbers, either floating point or integer, depending on the particular class/feature.

Figure 5:
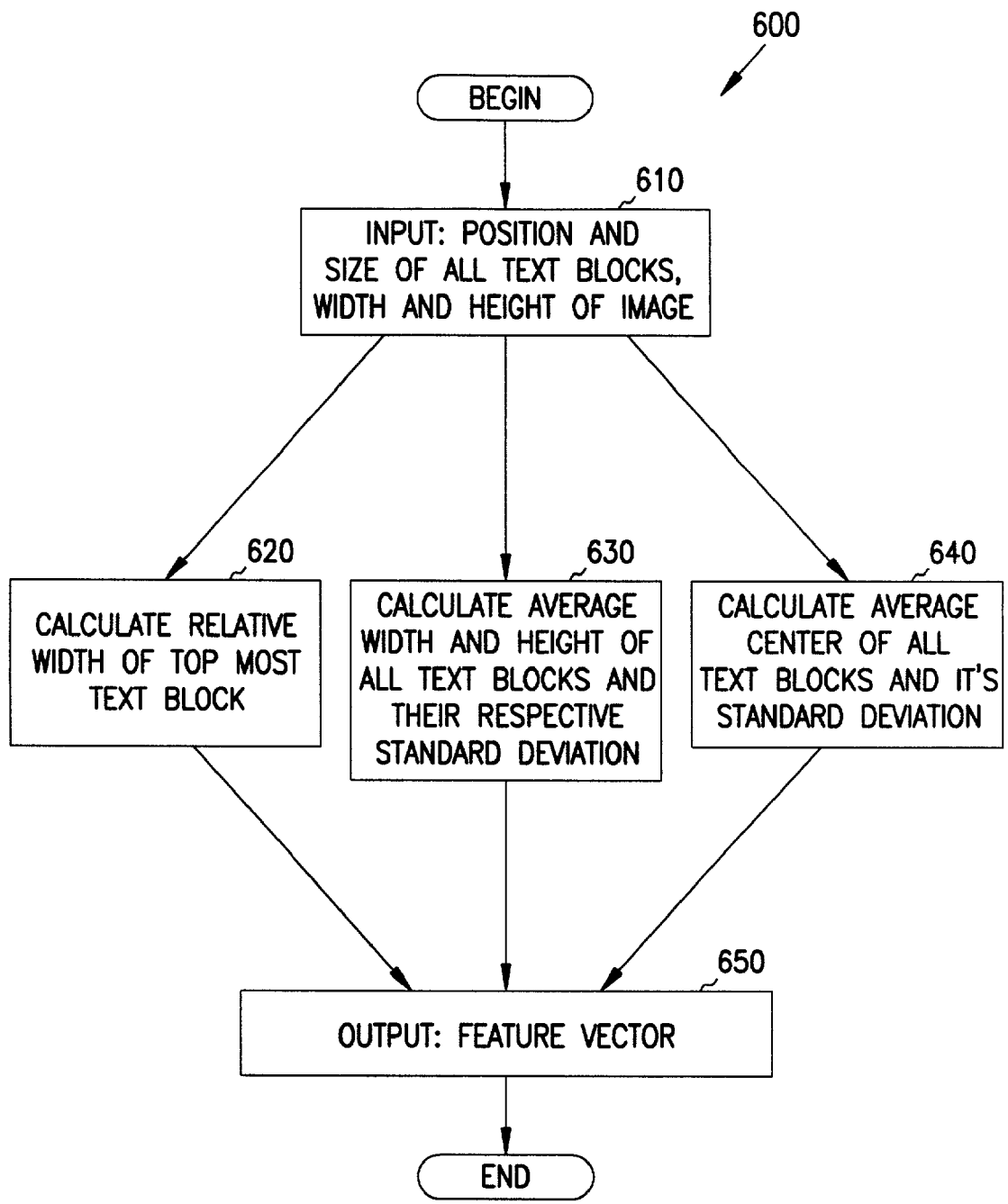
FIG. 5 is a flowchart of a method of determining text block features, as in determining text block features in FIG. 4, performed according to an embodiment of the invention.

FIG. 5 is a flowchart of a method 600 of a method of determining text block features, as in determining text block features 540 in FIG. 4, performed according to an embodiment of the invention.

Method 600 includes receiving or inputting position and/or size information of all text blocks, and the width and height of the image 610. Subsequently, method 600 includes calculating the relative width of the topmost text block, from the position and/or size information 620.

Method 600 also includes calculating the average of the width of all text blocks, calculating the average of the height of all text blocks, calculating the standard deviation of the width of all text blocks, calculating their respective standard deviations of the height of all text blocks 630; from the position and/or size information received in action 610.

Method 600 also includes calculating the average of the center of all text blocks and calculating the standard deviation of the center of all text blocks 640, from the position and/or size information received in action 610.

Subsequently, method 600 includes generating the feature vector 650 from the relative width of the topmost text block calculated in action 620, from the average of the width of all text blocks calculated in action 630, from the average of the height of all text blocks calculated in action 630, from the standard deviation of the width of all text blocks calculated in action 630, from the standard deviation of the height of all text blocks calculated in action 630, from the average of the center of all text blocks calculated in action 640, and from the standard deviation of the center of all text blocks calculated in action 640.

Figure 6:
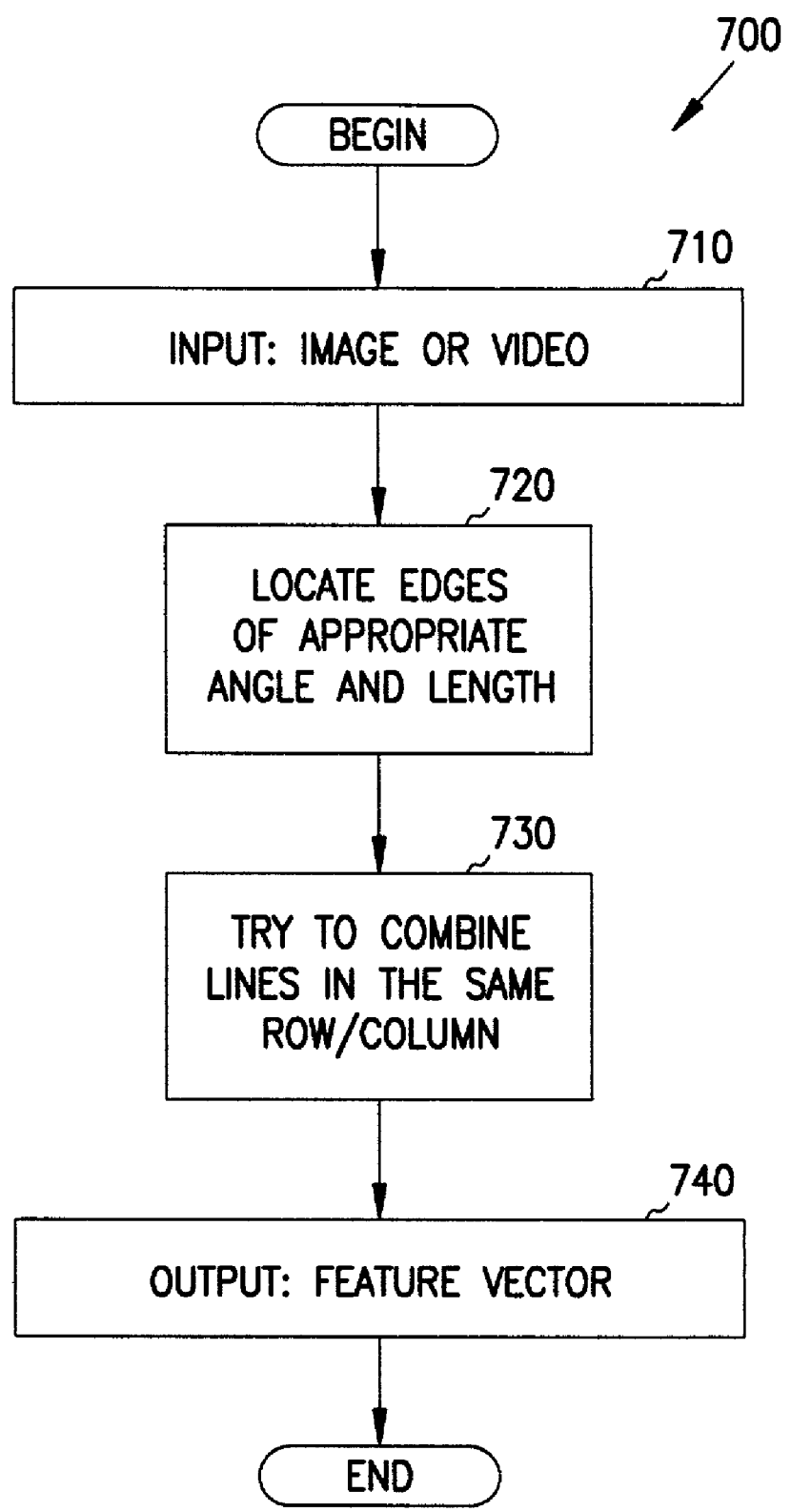
FIG. 6 is a flowchart of a method of determining edge features from an image, yielding a set of detected edges in the image, performed according to an embodiment of the invention.

FIG. 6 is a flowchart of a method 700 of a method of determining edge features from an image, yielding a set of detected edges in the image, performed according to an embodiment of the invention.

Method 700 includes receiving the image 710, and locating edges 720 of a predetermined appropriate angle and length from the image. Action 720 does not necessarily yields at least one located edge, but it usually does. The method also includes attempting to combine lines in the same row and column 730, from the at least one edge. The attempted combining 730 yields combined lines.

Subsequently, method 700 includes generating a feature vector 740 from the combined lines of action 730 and the located edges of action 720.

Figure 7:
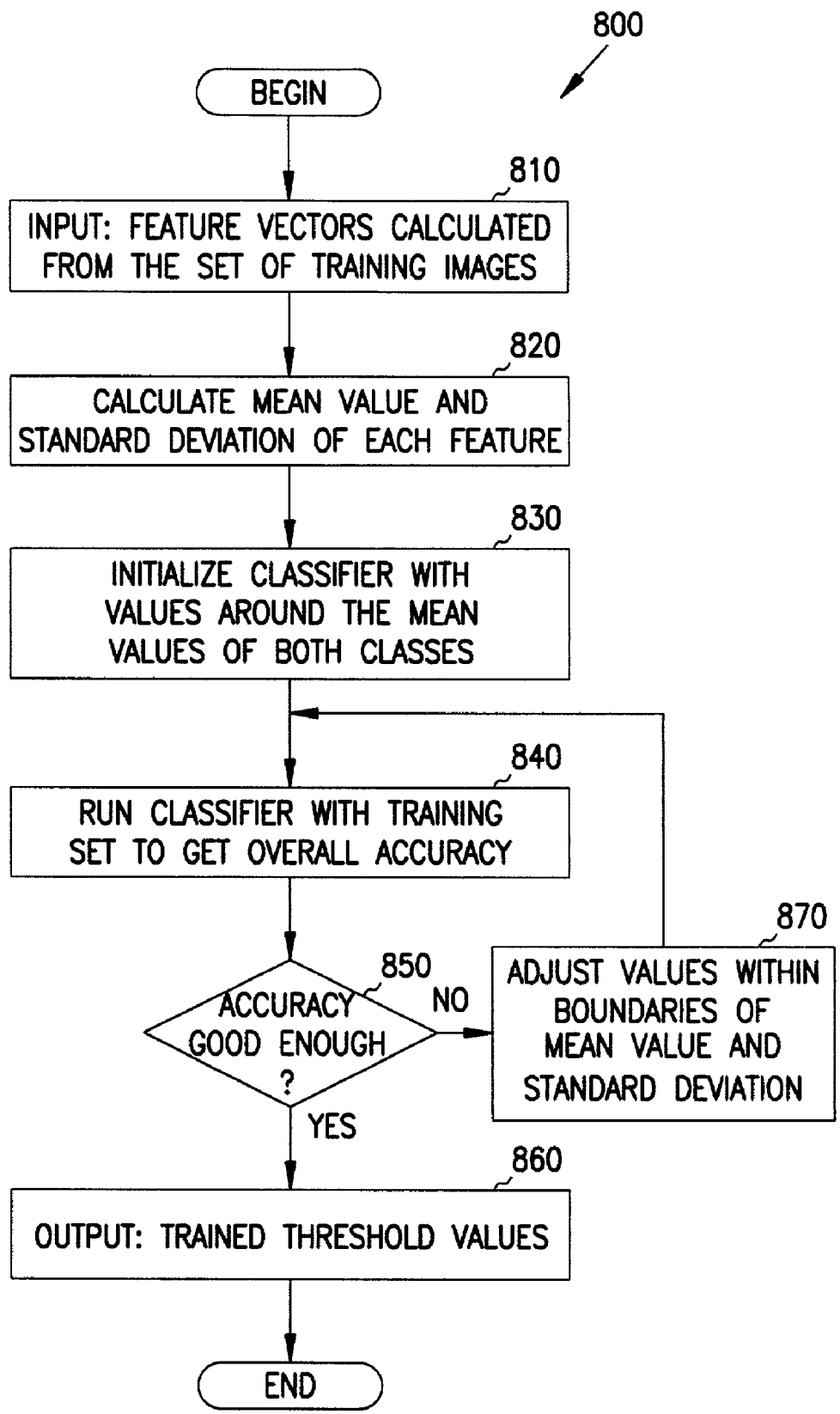
FIG. 7 is a flowchart of a method of learning classification by slide image versus comic image from a feature vector of a set of training images, performed according to an embodiment of the invention.

FIG. 7 is a flowchart of a method 800 of learning classification by slide image versus comic image from a feature vector of a set of training images, performed according to an embodiment of the invention. In one embodiment, method 800 is performed by learning component 230 in FIG. 1.

Method 800 also includes receiving a number of feature vectors of a number of training images 810. Thereafter, the method includes calculating a mean value of each feature component of the feature vectors and calculating the standard deviation of each feature component of the feature vectors 820. Subsequently, method 800 includes initializing at least one, one or more, operating parameters from about and/or around the mean values of the slide image class and the comic class 830. In one embodiment, the one or more operating parameters are one or more operating parameters of a classifier of the learning component 230 in FIG. 1.

Then the method 800 begins a loop that does not exit until a predetermined minimum threshold of accuracy is achieved. In one embodiment, the minimum threshold of accuracy is a measure of the percentage of correctly classified images. The method classifies the training images from the at least one operating parameter 840, yielding overall accuracy. Thereafter, a determination and/or comparison of whether the accuracy meets a predetermined minimum threshold is made 850. The determination yields an indication of success or an indication of failure. Where there is an indication of success that the accuracy meets the minimum threshold, method 800 includes generating trained threshold values 860. Where there is no indication of success that the accuracy meets the minimum threshold, method 800 includes adjusting the at least one operating parameter from about the mean values of the slide image class and the comic class 870 and the method continues with action 840.

Figure 8:
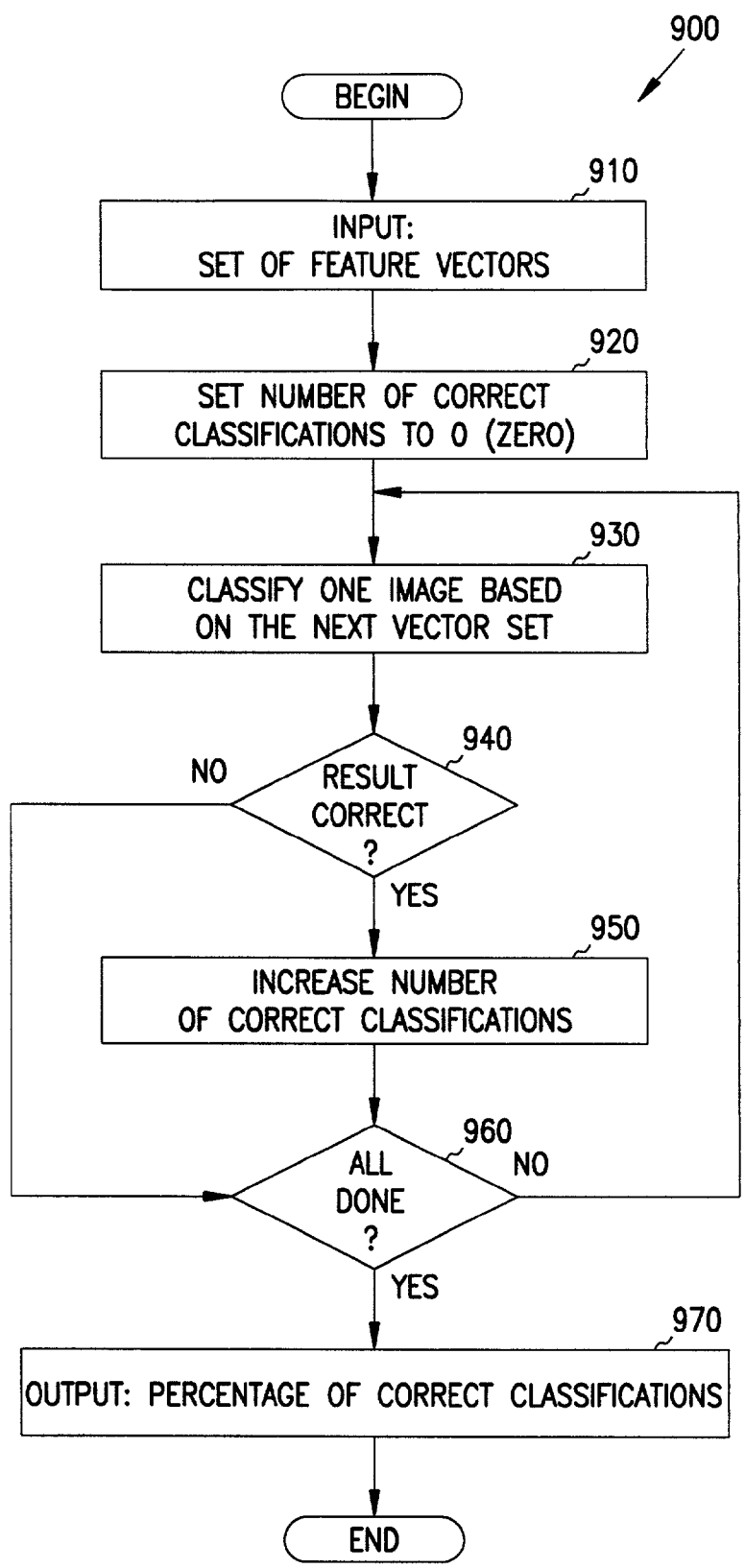
FIG. 8 is a flowchart of a method of classifying one or more training images from at least one operating parameter, as in FIG. 7, performed according to an embodiment of the invention.

FIG. 8 is a flowchart of a method 900 of classifying one or more training images from the at least one operating parameter, as in 840 in FIG. 7, performed according to an embodiment of the invention.

FIG. 8 includes receiving a set of one or more feature vectors 910. Thereafter, the method includes setting an indication of a correct number of classifications to zero 920 and setting an indication of a total number of classifications to zero.

Subsequently, the method includes classifying one out of the set of training images based on the next feature vector in the set of feature vectors 930. The classifying action 930 yields a generated classification. Thereafter, a determination of whether or not the generated classifying matches the actual classification of the one of the set of training images 940. If the determining is 940 is successful, the indication of a correct number of classifications is incremented by one.

Method 900 continues with incrementing the indication of a total number of classifications.

Thereafter, the method continues with classifying one out of the set of training images 930 for each remaining feature vector of the set of feature vectors.

Subsequently, the method includes generating or outputting the percentage of correct classifications 970 from the indication of a number of correct classifications, and from the indication of a total number of classifications.

Figure 9:
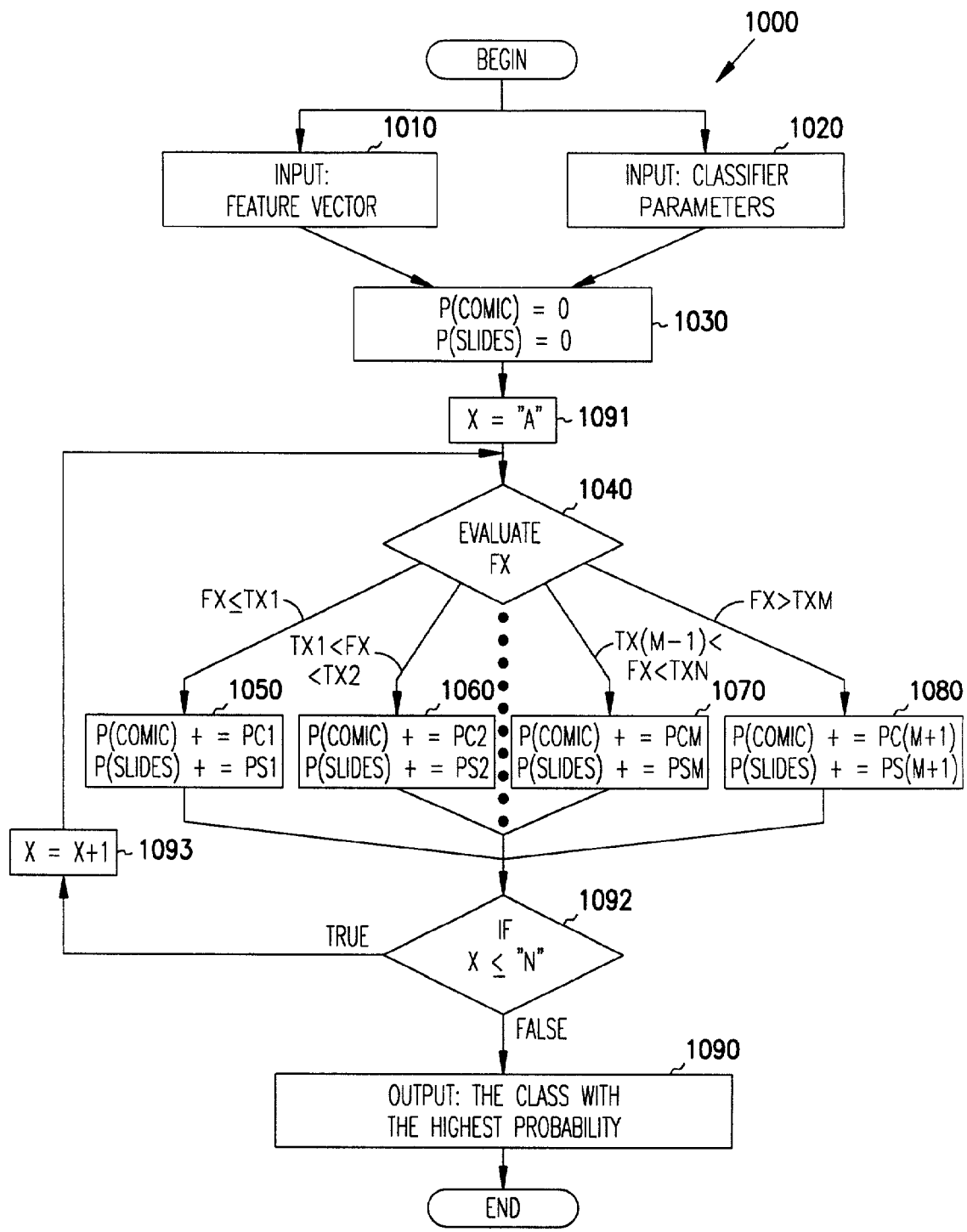
FIG. 9 is a flowchart of a method of classifying one of the training images, as in action in FIG. 8, performed according to an embodiment of the invention.

FIG. 9 is a flowchart of a method 1000 of classifying one of the training images, as in action 930 in FIG. 8, performed according to an embodiment of the invention.

Method 1000 includes receiving the feature vector 1010 and receiving the at least one operating parameter set 1020. The feature vector is notated as $f_X, \ldots, f_N$. The at least one operating parameter set is notated as $t_{X1}, \ldots, t_{XM}, t_{B1}, \ldots, t_{BM}, t_{N1}, \ldots, t_{NM}$.

Thereafter, the method includes initializing the probability of the image being a comic and initializing the probability of the image being a slide to zero 1030.

Subsequently, method 1000 initializes a loop counter variable "X" to the value of "A" 1091. Then the method begins a loop that encompasses actions 1040, 1050, 1060, 1070, 1080, and 1093, that is controlled by the comparison action 1092.

The loop includes evaluating 1040 the feature vector $f_X$ in comparison to the at least one operating parameter, $t_{X1}$.

After the evaluation 1040, in action 1050, the method increments the probability of the image being a comic by one of the amounts $P_{C1}, P_{C2}, P_{C3}, \ldots$ depending on the thresholds $_{X1}, \ldots, t_{XM}$ between which the part $f_X$ of the feature vector falls. Also the probability of the image being a slide is incremented by one of the amounts $P_{S1}, P_{S2}, P_{S3}, \ldots$ depending on the thresholds $t_{X1}, \ldots, t_{XM}$ between which the part $f_X$ of the feature vector falls.

For example, if $f_X <= t_{X1}$, the probabilities $P_{C1}$ and $P_{S1}$ are used.

If $t_{X1} < f_X <= t_{X2}$, the probabilities $P_{C2}$ and $P_{S2}$ are used.

If $t_{X2} < f_X <= t_{X3}$, the probabilities $P_{C3}$ and $P_{S3}$ are used.

... and so on for till

If $t_{X(M-1)} < f_X <= t_{XM}$, the probabilities $P_{C(M)}$ and $P_{S(M)}$ are used.

If $f_X >= t_{XM}$, the probabilities $P_{C(M+1)}$ and $P_{S(M+1)}$ are used.

The actions of evaluating 1040, and incrementing 1050, 1060, 1070, and 1080 are repeated for each element (A ... N) in the feature vector $(f_X \ldots f_N)$.

The loop is continued if the loop counter variable "X" is less than the value represented by "N" 1092.

The loop continues by incrementing 1093 the loop counter variable "X", and with the evaluation in action 1040.

After the loop of method 1000 ends, the method 1000 includes generating the class having the highest probability 1090.

Figure 10:
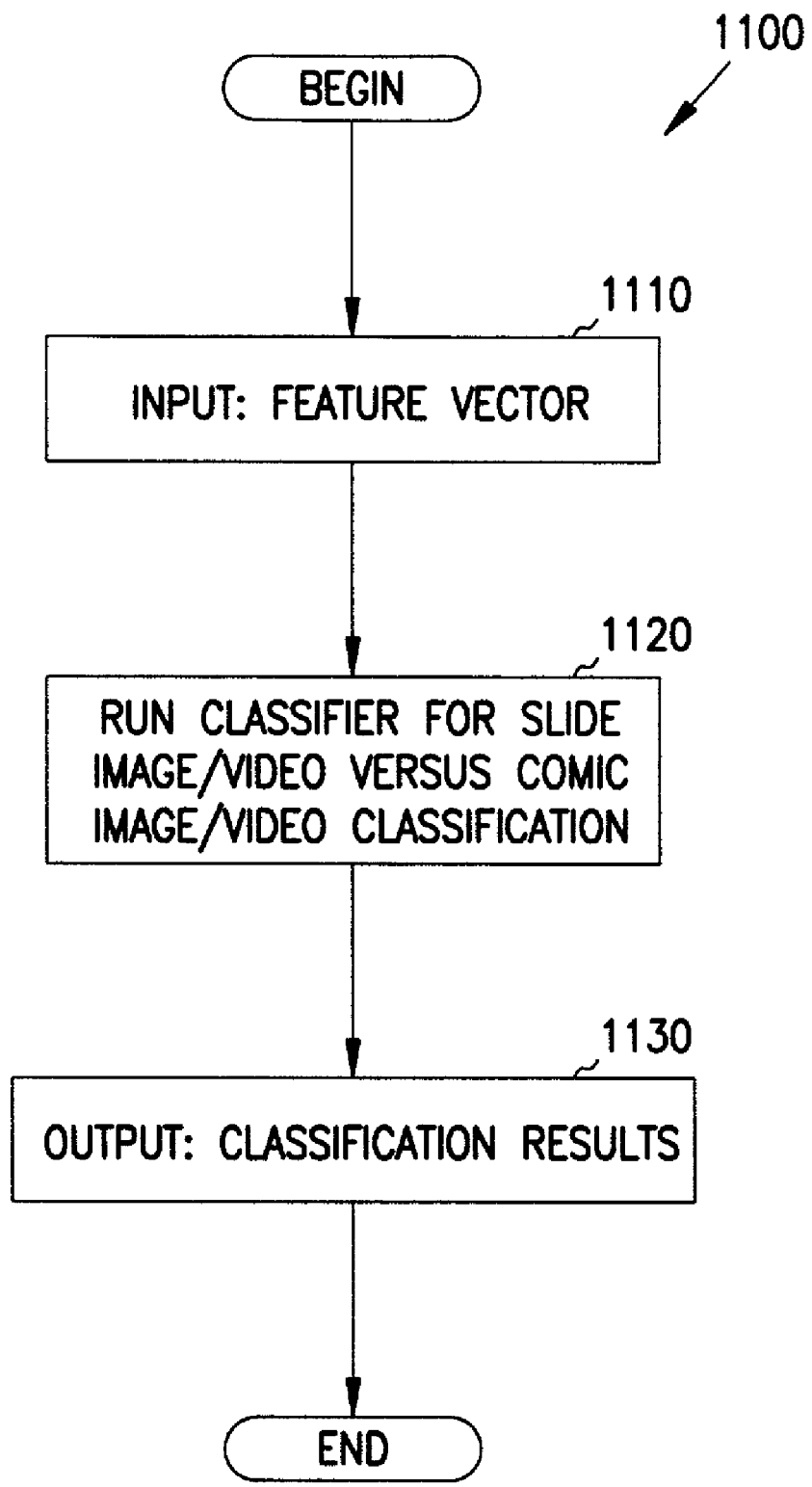
FIG. 10 is a flowchart of a method of classifying an image by slide image versus comic image classification from a feature vector of an image, performed according to an embodiment of the invention.

FIG. 10 is a flowchart of a method 1100 of classifying an image as slide image versus comic image from a feature vector of an image, performed according to an embodiment of the invention. In one embodiment, method 1100 is performed by classification component 240 in FIG. 1.

Method 1100 includes inputting or receiving a feature vector 1110, such as the feature vector generated by feature extraction component 220 in FIG. 1, or produced by method 500 in FIG. 4.

Thereafter, the method includes classifying an image as slide image versus comic image based on the received feature vector 1120. In one embodiment, the image is the image 210 in FIG. 1. In another embodiment, the classifying is performed in accordance with method 1000 in FIG. 9.

Subsequently, the method includes outputting or generating the classification of the image 1130.

Figure 11:
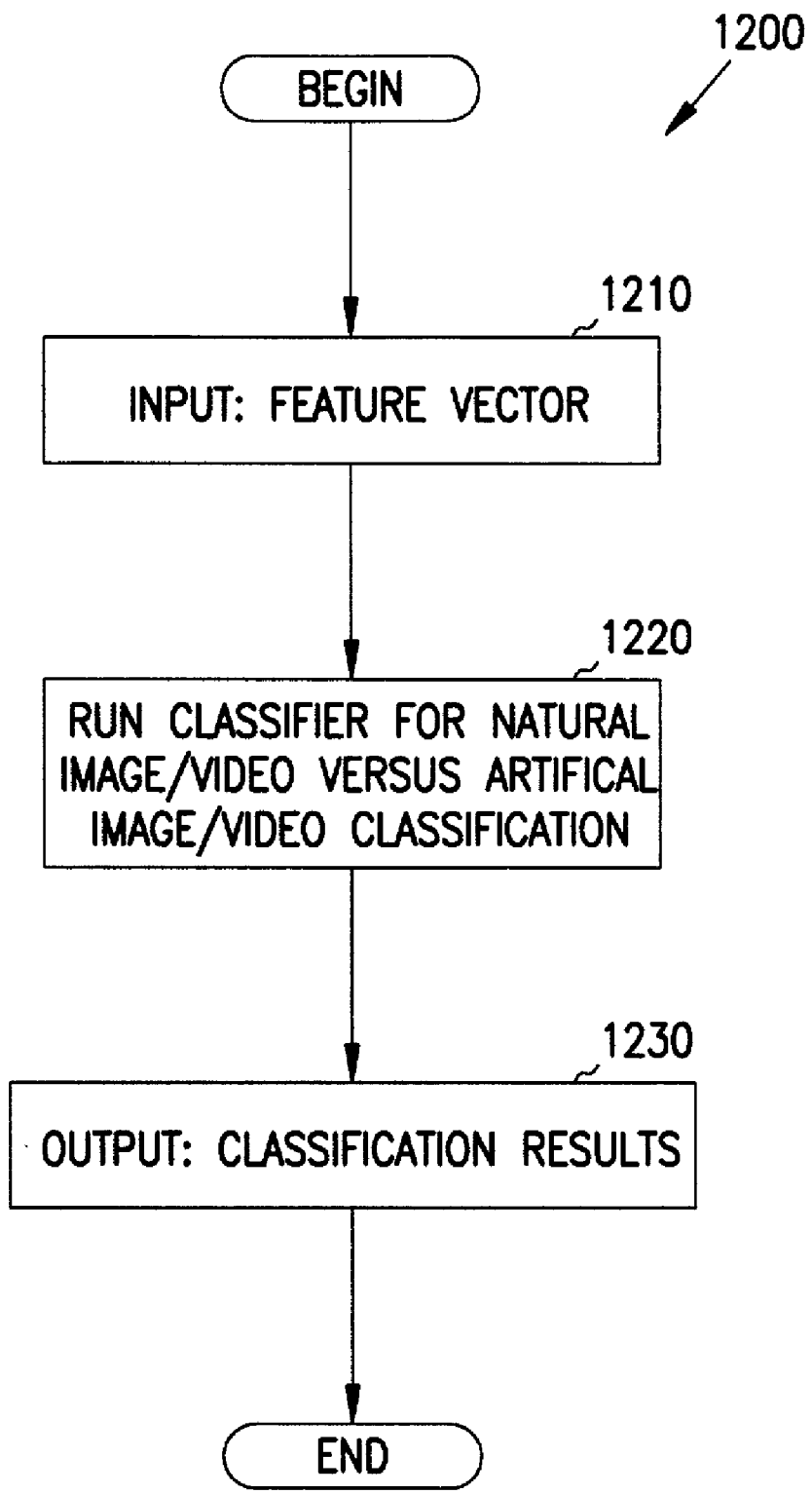
FIG. 11 is a flowchart of a method of classifying an image by natural image versus artificial image classification from a feature vector of an image, performed according to an embodiment of the invention.

FIG. 11 is a flowchart of a method 1200 of classifying an image as natural image versus an artificial image from a feature vector of an image, performed according to an embodiment of the invention. In one embodiment, method 1200 is performed by classification component 240 in FIG. 1.

The method includes inputting or receiving a feature vector 1210, such as the feature vector generated by feature extraction component 220 in FIG. 1, or produced by method 300 in FIG. 2. Thereafter, the method includes classifying an image 1220 associated with the feature vector as a natural image versus an artificial image based on the received feature vector. Subsequently, the method includes outputting or generating the classification of the image 1230.

FIG. 12 is a flowchart of a method 1300 of extracting an edge-sharpness feature vector, performed according to an embodiment of the invention.

Method 1300 includes generating 1310 a second image with reduced edge-sharpness from a $1^{st}$ image. The second image is a blurred version of the first image.

Thereafter, method 1300 includes calculating 1320 a difference between the first image and the second image. Action 1320 yields a feature vector.

Subsequently, method 1300 includes calculating a pixel histogram 1330 from the corresponding difference.

Figure 13:
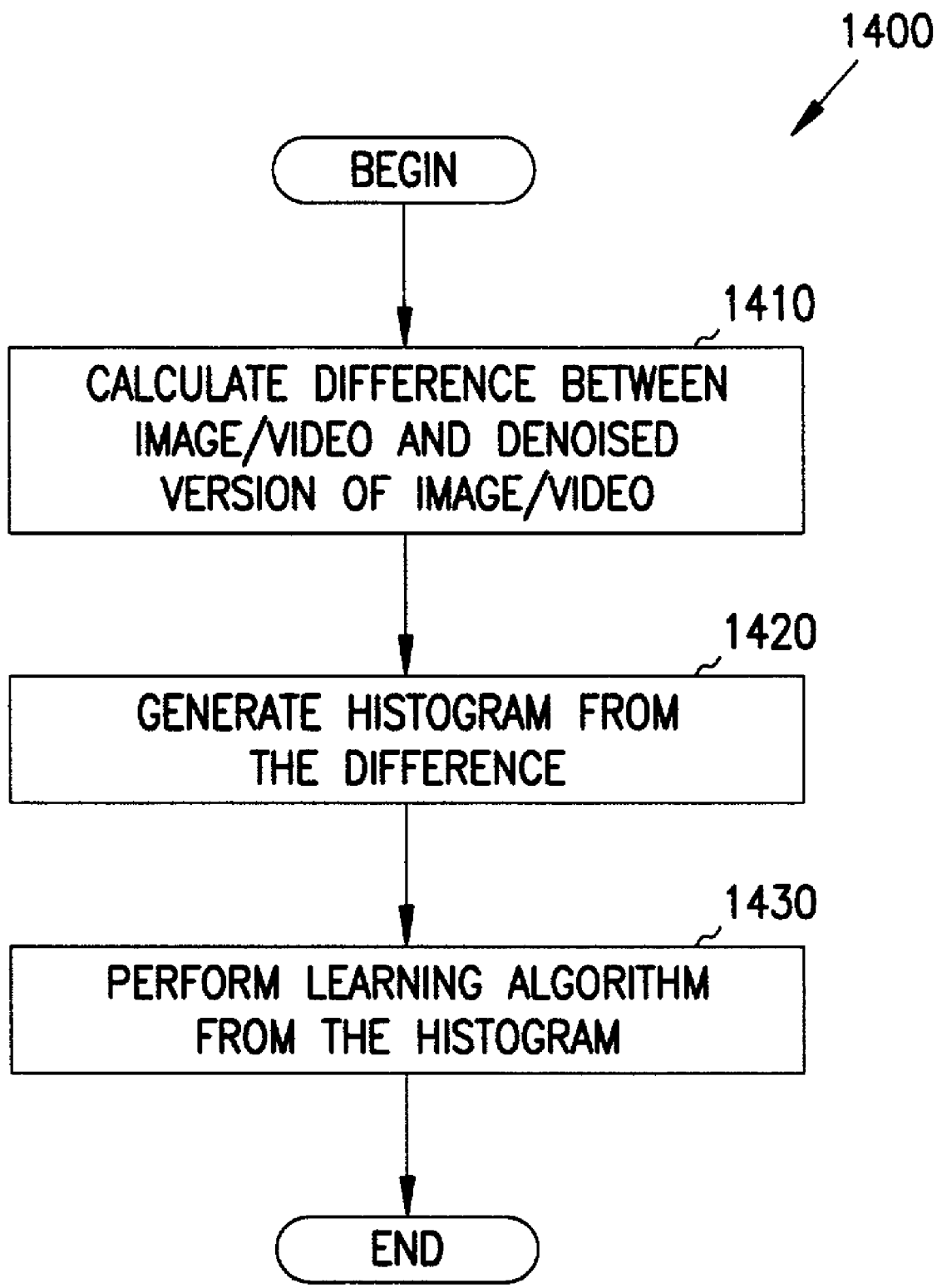
FIG. 13 is a flowchart of a method for reducing noise in an image, performed according to an embodiment of the invention.

FIG. 13 is a flowchart of a method 1400 for reducing noise in an image, performed according to an embodiment of the invention.

Method 1400 includes calculating 1410 a difference between the image and a de-noised version of the image.

Subsequently, method 1400 includes generating a histogram 1420 from the difference.

Thereafter, a learning algorithm is performed on the histogram 1430.

In one embodiment, the image is a frame in a video stream. In another embodiment, the learning algorithm is Learning Vector Quantization or Support Vector Machine.

In still yet other embodiments, methods 300, 400, 500, 600, 800, 900, 1000, 1100, 1200, 1300, and 1400 are implemented as a computer data signal embodied in a carrier wave, that represents a sequence of instructions which, when executed by a processor, to cause the processor to perform methods 300, 400, 500, 600, 800, 900, 1000, 1100, 1200, 1300, and 1400, respectively.

Implementation

Figure 14:
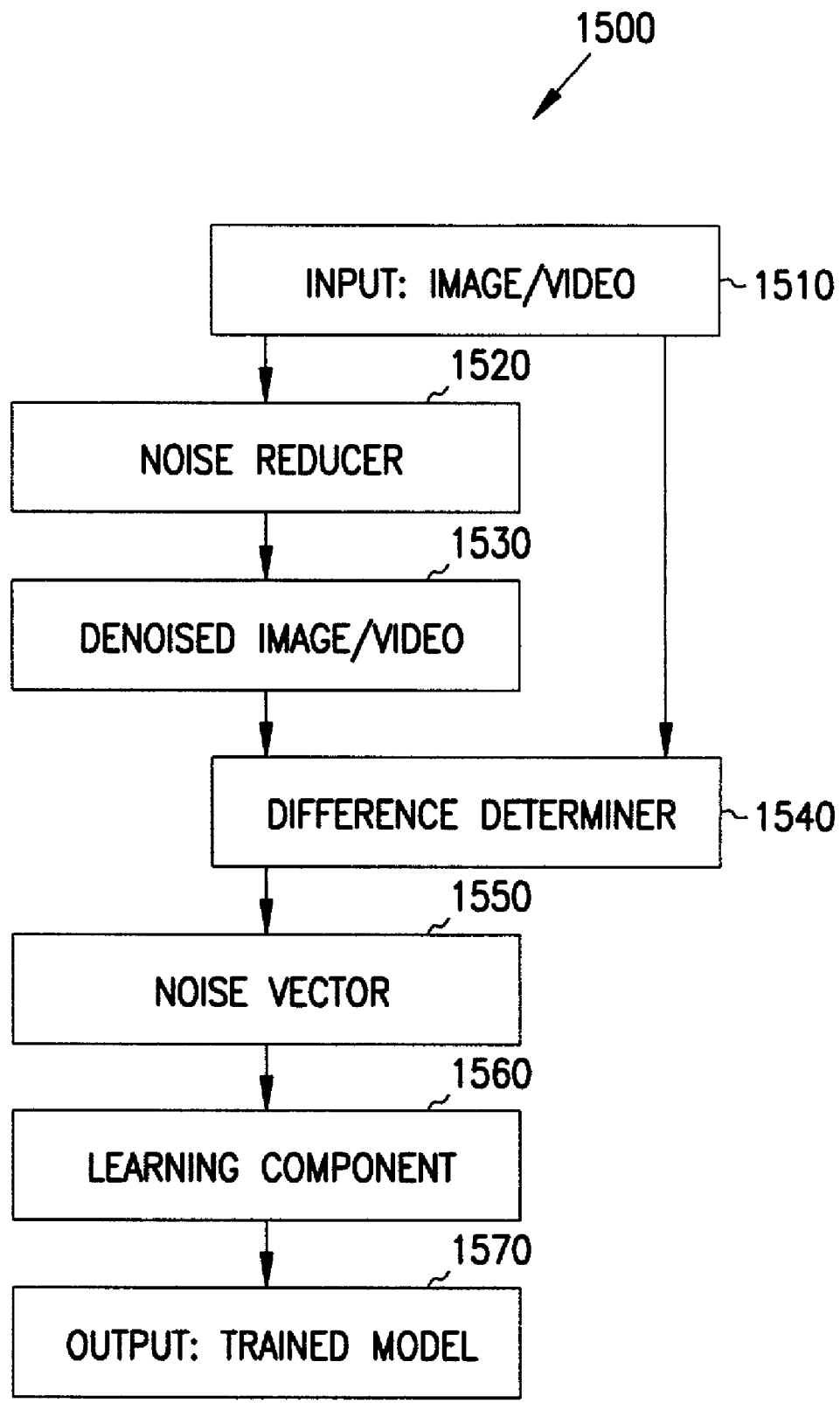
FIG. 14 is a block diagram of an apparatus for learning classification between a natural image class versus artificial image class from a noise vector of an image, performed according to an embodiment of the invention.
Figure 15:
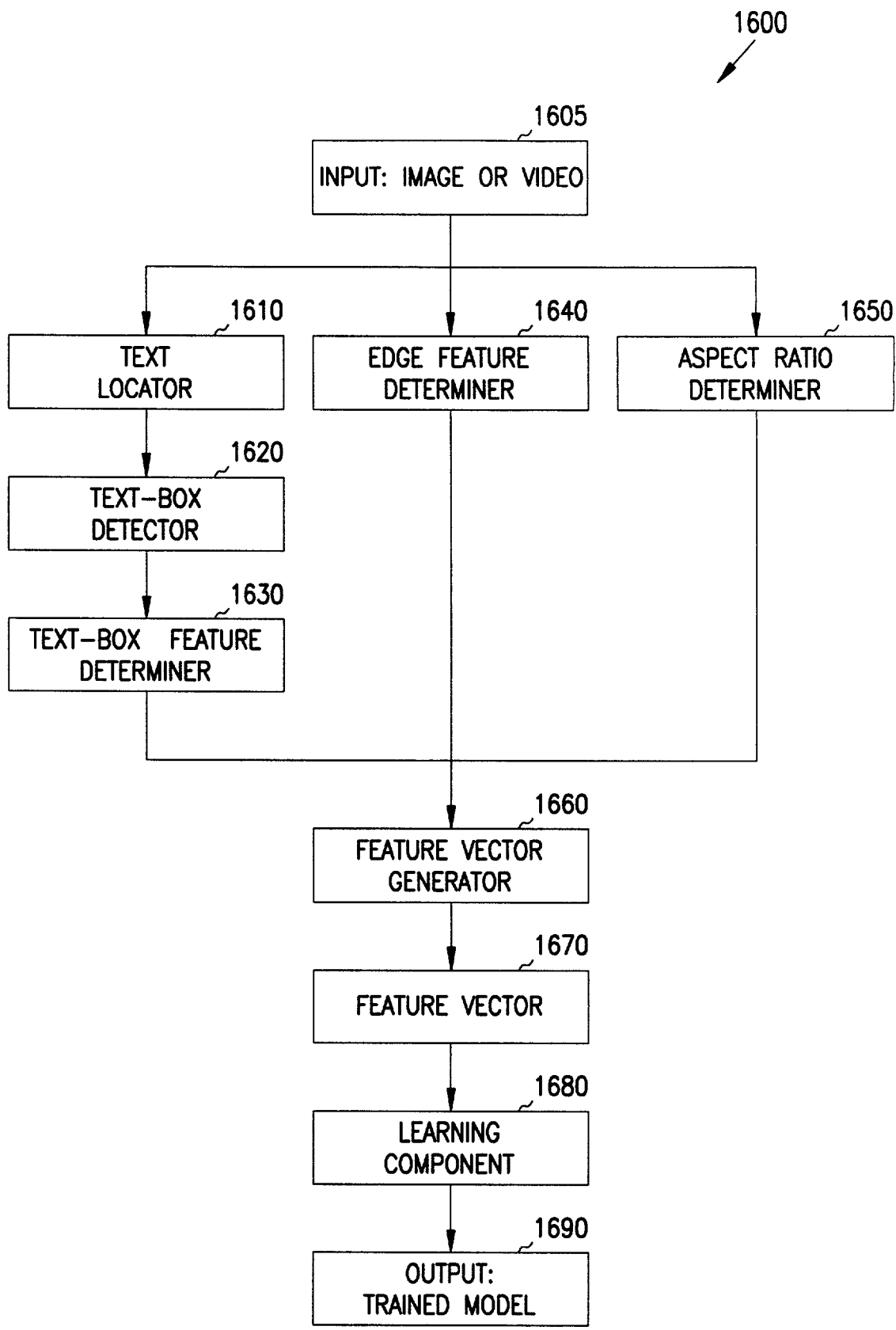
FIG. 15 is a block diagram of an apparatus for learning classification between slide image class versus comic image class from a feature vector of an image, such as calculated in FIG. 4, performed according to an embodiment of the invention.

Referring to FIGS. 14–15, a particular implementation of the invention is described.

FIG. 14 is a block diagram of an apparatus 1500 for learning classification between natural image class versus artificial image class from a noise vector of an image, performed according to an embodiment of the invention. In one embodiment, apparatus 1500 implements the method 1200 of FIG. 11.

Apparatus 1500 includes noise-reducer 1520 that generates a noise-reduced second image 1530 from a first image 1510. In varying embodiments, the noise-reducer implements a median filer, a Wiener filter and/or a Gaussian filter.

Apparatus also includes a difference determiner 1540 that is operably coupled to the noise-reducer 1520, that determines the difference between the first image 1510 and the second image 1530, yielding a noise vector 1550.

Apparatus 1500 also includes a learning component 1560, as in learning component 230 in FIG. 1, that trains a classification model 1570, as in trained model 250 in FIG. 1, to classify a third image (not shown) as a natural image versus an artificial image, from the noise vector 1550.

FIG. 15 is a block diagram of an apparatus 1600 for learning classification between slide image class versus comic image class from a feature vector of an image, such as calculated in FIG. 4, performed according to an embodiment of the invention. In one embodiment, apparatus 1600 implements the method 1000 of FIG. 9.

Apparatus 1600 includes a text locator 1610 of the first image 1605, which yields a text-defined image. Apparatus 1600 also includes a text box detector 1620 operably coupled to the text locator 1610 that yields a text-box defined image from the text-defined image. Apparatus 1600 also includes a text block feature determiner 1630 that is operably coupled to the text block feature determiner 1620, and that uses the text-box defined image.

Apparatus 1600 also includes a determiner 1640 of edge features of the image, that yields a set of detected edges in the input image.

Apparatus 1600 also includes a determiner 1650 of the aspect ratio of the image.

Apparatus 1600 also includes a generator 1660 of a feature vector 1670, that is operably coupled to the text block feature determiner 1630, the determiner of edge features of the image 1640, and to the determiner of the aspect ratio of the image 1650.

Apparatus 1600 also includes a learning component 1680, as in learning component 230 in FIG. 1, that trains a classification model 1690, as in trained model 250 in FIG. 1, to classify a second image (not shown) as a slide image versus an comic image, from the feature vector.

The apparatus 1500 and 1600 components can be embodied as computer hardware circuitry or as a computer-readable program, or a combination of both.

The components execute on as few as one computer or on at least as many computers as there are components.

CONCLUSION

Systems, methods and apparatus are provided through which a realistic-looking image is classified in terms of being natural versus artificial (i.e., computer generated), or an graphical image being a scientific slide presentation versus a comic image. The image is classified by extracting appropriate feature(s) from the image, and using the feature(s) to determine with which likelihood an image belongs to one of the four classes. The classification determination uses a trained model. The trained model is created by establishing one or more predetermined classification parameters based on a group of images of known classification, then attempting classification of a second group of images of known classification by using these parameters, comparing the classification of the second group of images with their known classification in order to measure the accuracy of the classification of the second group of images, and thereafter changing the one or more predetermined classification parameters to improve the accuracy of the classification of the second group of images. This process of changing the classification parameters continues, until the classification performance is sufficient or cannot be further improved.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The terminology used in this application with respect to is meant to include all object-oriented, database and communication environments and alternate technologies which provide the same functionality as described herein. Therefore, it is manifestly intended that this invention be limited only by the following claims and equivalents thereof.

We claim:

1. A method to train image classification, comprising:
measuring noise and edge sharpness in a first image;
generating a feature vector from the first image by;
generating a noise-reduced second image from the first image;
calculating a difference between the first image and the second image;
generating a noise pixel histogram of the difference to use as a noise feature vector;
generating a blurred third image from the first image;
calculating another difference between the first image and the third image;
generating a sharpness pixel histogram of the another difference to use as a sharpness feature vector; and
combining the noise feature vector and the sharpness feature vector as the feature vector; and
training a classification model from the feature vector to classify a fourth image as a natural image versus an artificial image from the noise and the edge sharpness in the fourth image.

2. The method of claim 1, wherein generating the noise-reduced second image further comprises applying a median filter to the first image.

3. The method of claim 1, wherein generating the noise-reduced second image further comprises applying a Gaussian filter to the first image.

4. The method of claim 1, wherein generating the noise-reduced second image further comprises applying a Wiener filter to the first image.

5. The method of claim 1, wherein the first image further comprises a frame in a video stream.

6. The method of claim 1, wherein generating a blurred third image from the first image further comprises applying a Gaussian filter to the first image.

7. The method of claim 1, wherein the first image further comprises all frames in a video stream.

8. A method to classify a first image as natural image versus artificial image, further comprising:
receiving a feature vector of the first image, wherein the feature vector comprises a combination of a noise vector and a sharpness vector of the first image;
classifying the first image as natural image versus artificial image from the feature vector; and
generating the classification of the image;
wherein the classifying in is based on training from the combination of a noise feature vector and a sharpness feature vector, the noise feature vector including a pixel histogram of a difference between a second image and a noise-reduced third image generated from the second image, and the sharpness feature vector including a pixel histogram of a difference between the second image and a blurred fourth image generated from the second image.

9. The method of claim 8, wherein the classification is performed on a set of video frames of a video sequence, and the most likely classification result emerging out of the classification results of the individual frames is taken as the class of the video sequence.

10. An image classification system comprising:
a feature extraction component to extract a feature that distinguishes a frame in a video stream between a natural image versus an artificial image; and
a training system operably coupled to the feature extraction component to train a classification model to distinguish the feature based on a combination of a noise feature vector and a sharpness feature vector;
wherein the noise feature vector includes a pixel histogram of a difference between a first image and a noise-reduced second image generated from the second image, and the sharpness feature vector includes a pixel histogram of a difference between the first image and a blurred third image generated from the first image.

11. The system of claim 10, wherein the classification is performed on a set of video frames of a video sequence, and the most likely classification result emerging out of the classification results of the individual frames is taken as the class of the video sequence.

12. A system to classify an image comprising:
a processor;
a storage device coupled to the processor;
a training system coupled to the processor to train classification of at least one image as either a natural image or an artificial image based on a combination of a noise feature vector and a sharpness feature vector, the noise feature vector including a pixel histogram of a difference between a first image and a noise-reduced second image generated from the first image, and the sharpness feature vector including a pixel histogram of a difference between the first image and a blurred third image generated from the first image; and
a classification component coupled to the processor to classify the at least one image as either a natural image or an artificial image based on the trained classification and utilizing a noise vector and a sharpness vector of the least one image.

13. The system of claim 12, wherein the at least one image further comprises at least one frame in a video stream.

14. A computer-readable medium encoded with a computer program having computer-executable instructions to cause a computer to perform a method comprising:
measuring noise and edge sharpness in a first image;
generating a feature vector from the first image by;
generating a noise-reduced second image from the first image;
calculating a difference between the first image and the second image;
generating a noise pixel histogram of the difference to use as a noise feature vector;
generating a blurred third image from the first image;
calculating another difference between the first image and the third image;
generating a sharpness pixel histogram of the another difference to use as a sharpness feature vector; and
combining the noise feature vector and the sharpness feature vector as the feature vector; and training a classification model from the feature vector to classify a fourth image as a natural image versus an artificial image from the noise and the edge sharpness in the fourth image.

15. The computer-readable medium of claim 14, wherein the first image further comprises a frame in a video stream.

16. A computer-readable medium encoded with a computer program having computer-executable instructions to cause a computer to perform a method comprising:
receiving a feature vector of a first image, wherein the feature vector is a combination of a noise vector and sharpness vector of the first image;
classifying the first image as natural image versus an artificial image from the feature vector; and
generating the classification of the image;
wherein the classifying is based on training from a combination of a noise feature vector and a sharpness feature vector, the noise feature vector including a pixel histogram of a difference between a second image and a noise-reduced third image generated from the second image, and the sharpness feature vector including a pixel histogram of a difference between the second image and a blurred fourth image generated from the second image.

17. The computer-readable medium of claim 16, wherein the classification is performed on a set of video frames of a video sequence, and the most likely classification result emerging out of the classification results of the individual frames is taken as the class of the video sequence.

18. An apparatus to train classification of at least one image, comprising:
a processor;
a storage device coupled to the processor; and
a training system coupled to the processor to train classification of at least one image as either a natural image or an artificial image, wherein the training system further comprises a generator of a noise feature vector and sharpness feature vector of the at least one image;
wherein the classification is based on training from a combination of the noise feature vector and the sharpness feature vector, the noise feature vector including a pixel histogram of a difference between a first image and a noise-reduced second image generated from the first image, and the sharpness feature vector including a pixel histogram of a difference between the first image and a blurred third image generated from the first image.

19. The apparatus of claim 18, wherein the at least one image further comprises at least one frame in a video stream.

20. An apparatus to classify an image, comprising:
a processor;
a storage device coupled to the processor; and
a classification component coupled to the processor to classify a first image as either a natural image or an artificial image, wherein the classification component further comprises a feature vector generator to generate both of a noise vector and a sharpness vector of the first image;
wherein the classifying is based on training from a combination of a noise feature vector and a sharpness feature vector, the noise feature vector including a pixel histogram of a difference between a second image and a noise-reduced third image generated from the second image, and the sharpness feature vector including a pixel histogram of a difference between the second image and a blurred fourth image generated from the second image.

21. The apparatus of claim 20, wherein the classifying is performed on a set of video frames of a video sequence, and the most likely classification result emerging out the classification results of the individual frames is taken as the class of the video sequence.

* * * * *

UNITED STATES PATENT AND TRADEMARK OFFICE
CERTIFICATE OF CORRECTION

| | |
|---|---|
| PATENT NO. | : 7,171,042 B2 |
| APPLICATION NO. | : 09/729867 |
| DATED | : January 30, 2007 |
| INVENTOR(S) | : Hartmann et al. |

Page 1 of 1

It is certified that error appears in the above-identified patent and that said Letters Patent is hereby corrected as shown below:

In column 11, at line 22, delete ";" and insert --:--.

In column 11, at line 64, delete "in".

In column 12, at line 54, delete ";" and insert --:--.

Signed and Sealed this

Eighth Day of April, 2008

JON W. DUDAS
*Director of the United States Patent and Trademark Office*